Feb. 13, 1968 L. G. STEWART 3,368,839
EXPANDABLE CAMPER
Filed March 4, 1966 11 Sheets-Sheet 1

INVENTOR.
LYLE G. STEWART
BY Gene W. Arnt
ATTORNEY

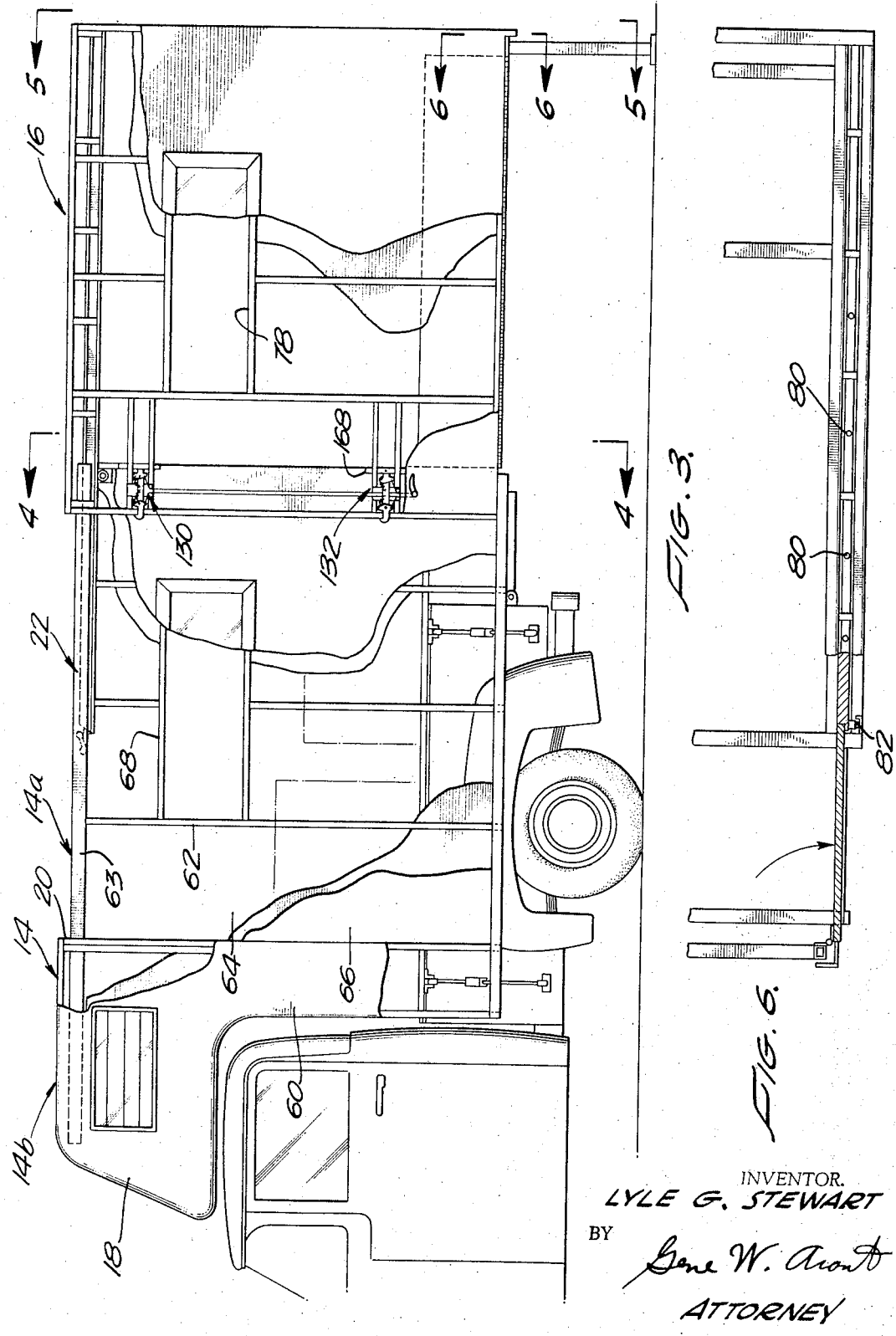

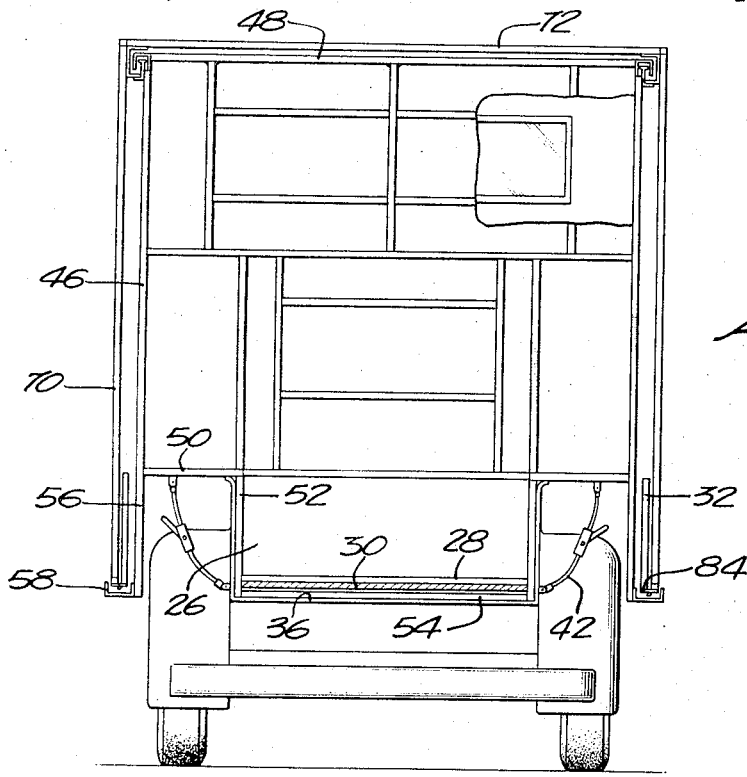
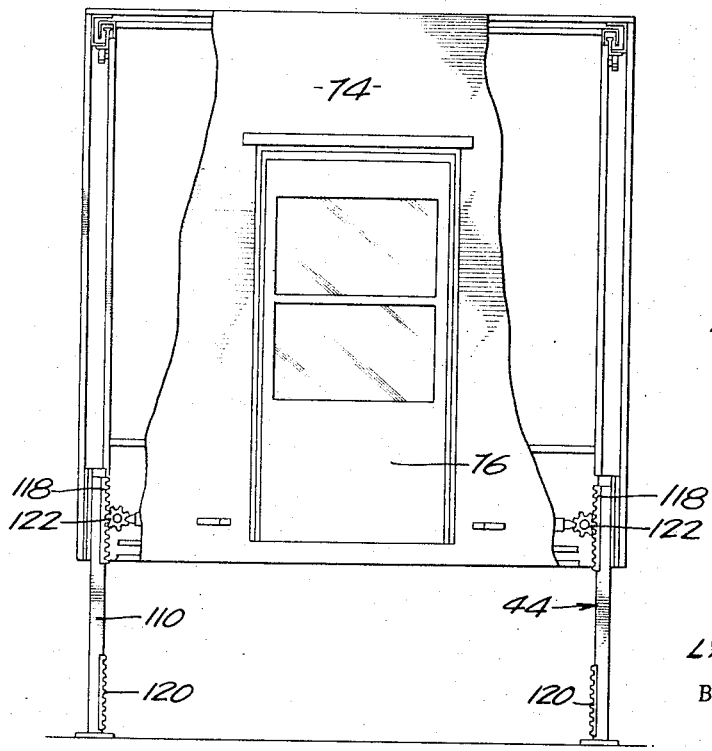

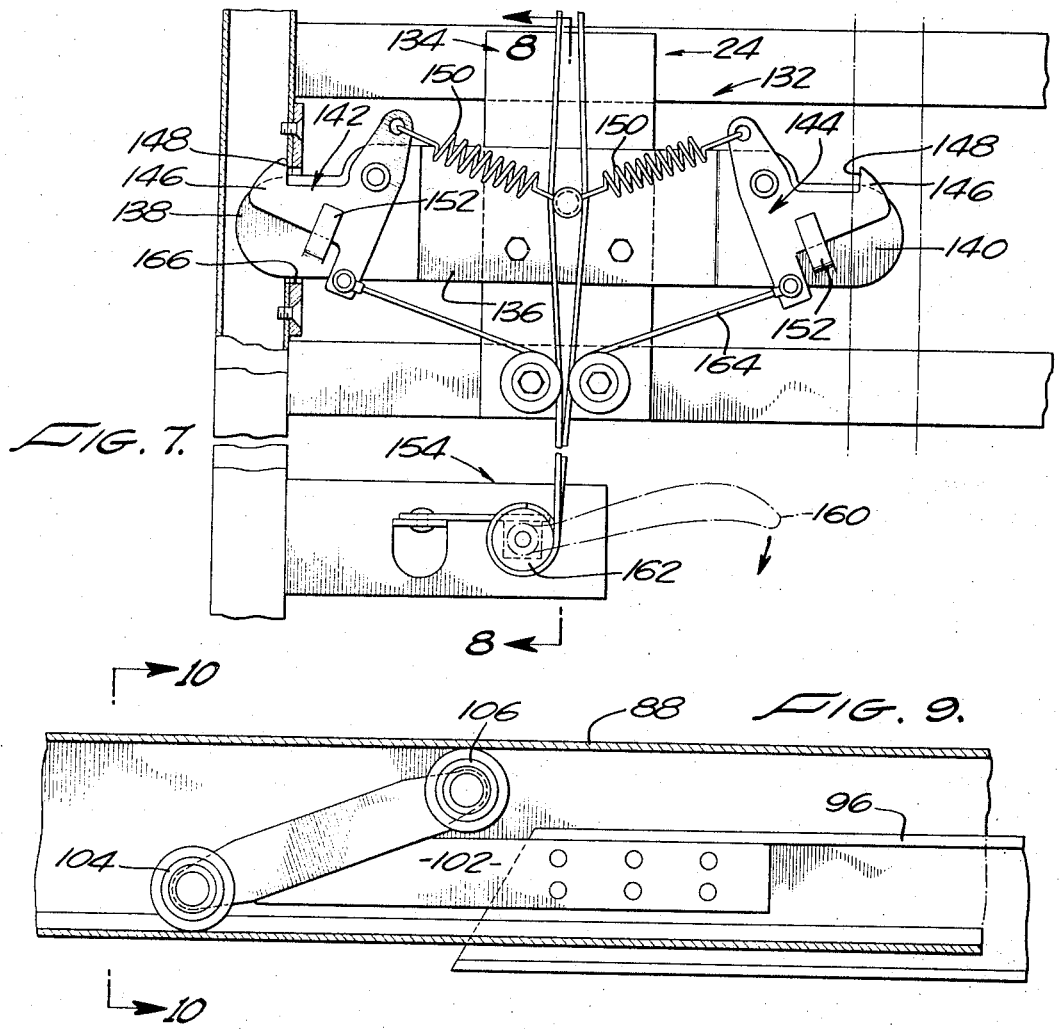
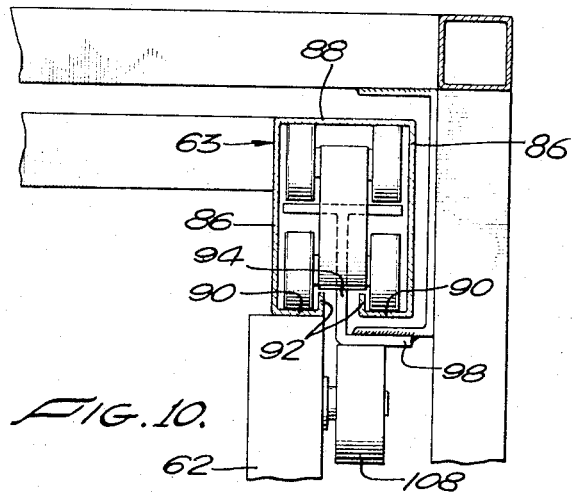
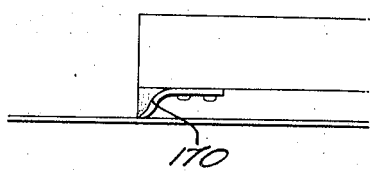

Feb. 13, 1968 L. G. STEWART 3,368,839
EXPANDABLE CAMPER
Filed March 4, 1966 11 Sheets-Sheet 5
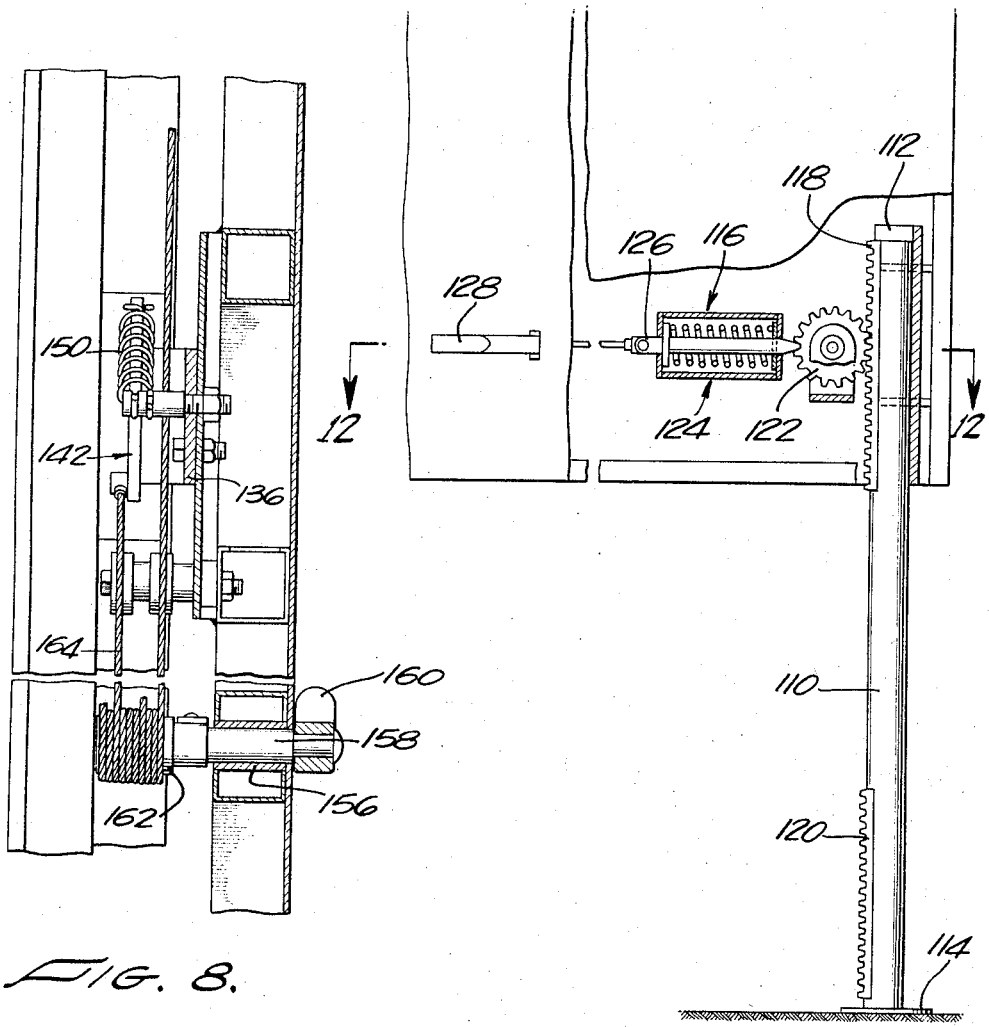
FIG. 8.
FIG. 11.
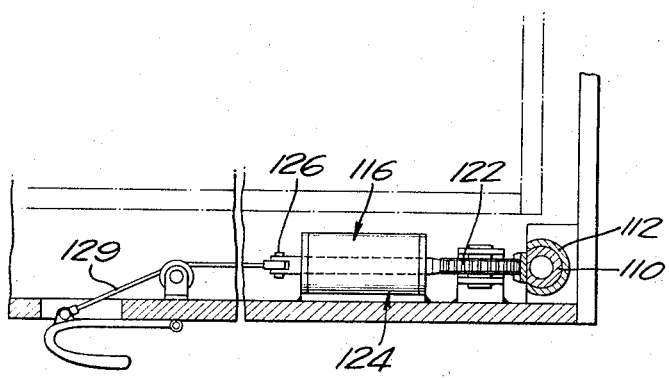
FIG. 12.
INVENTOR.
LYLE G. STEWART
BY Gene W. Arant
ATTORNEY

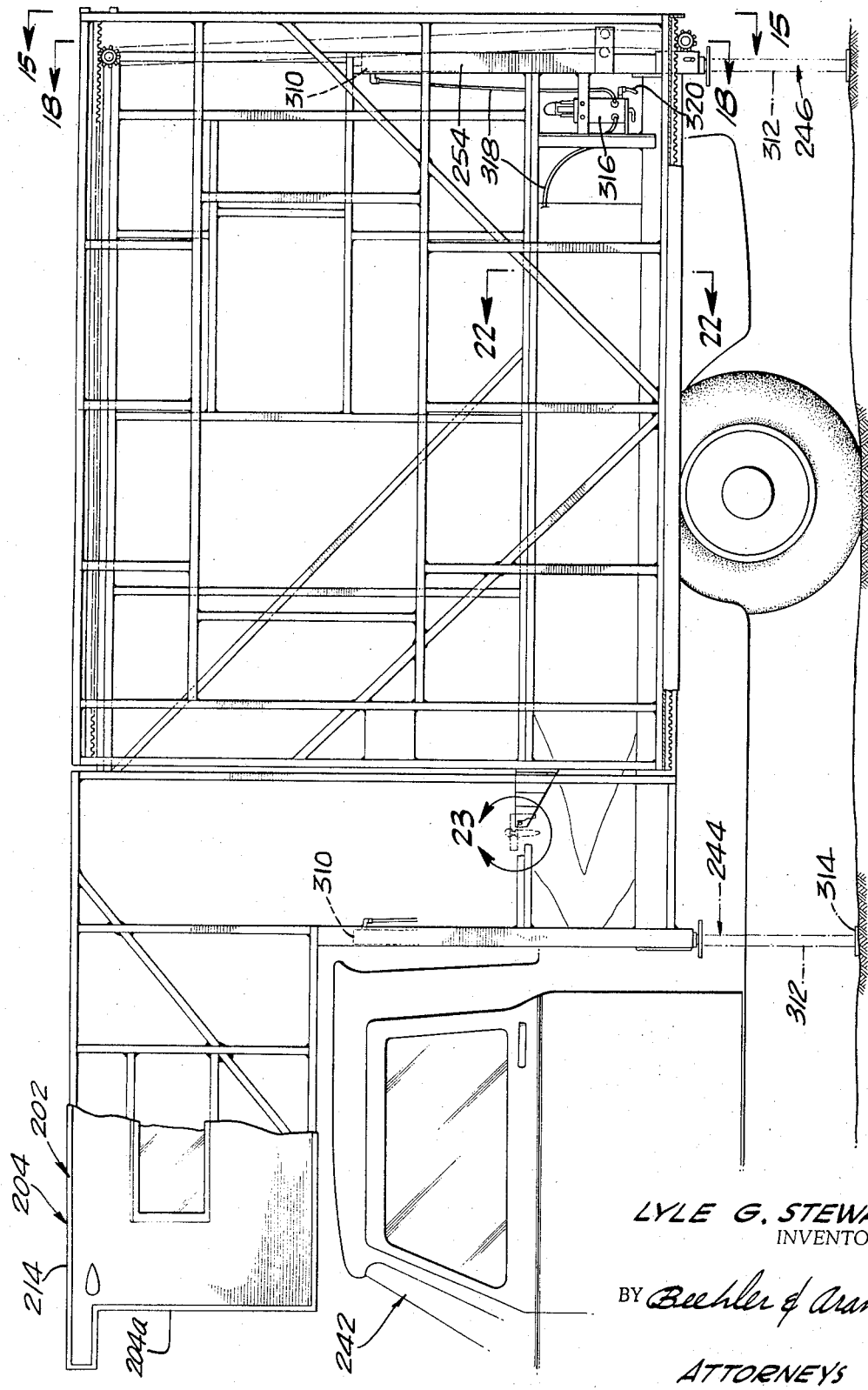

Feb. 13, 1968  L. G. STEWART  3,368,839
EXPANDABLE CAMPER
Filed March 4, 1966  11 Sheets-Sheet 7
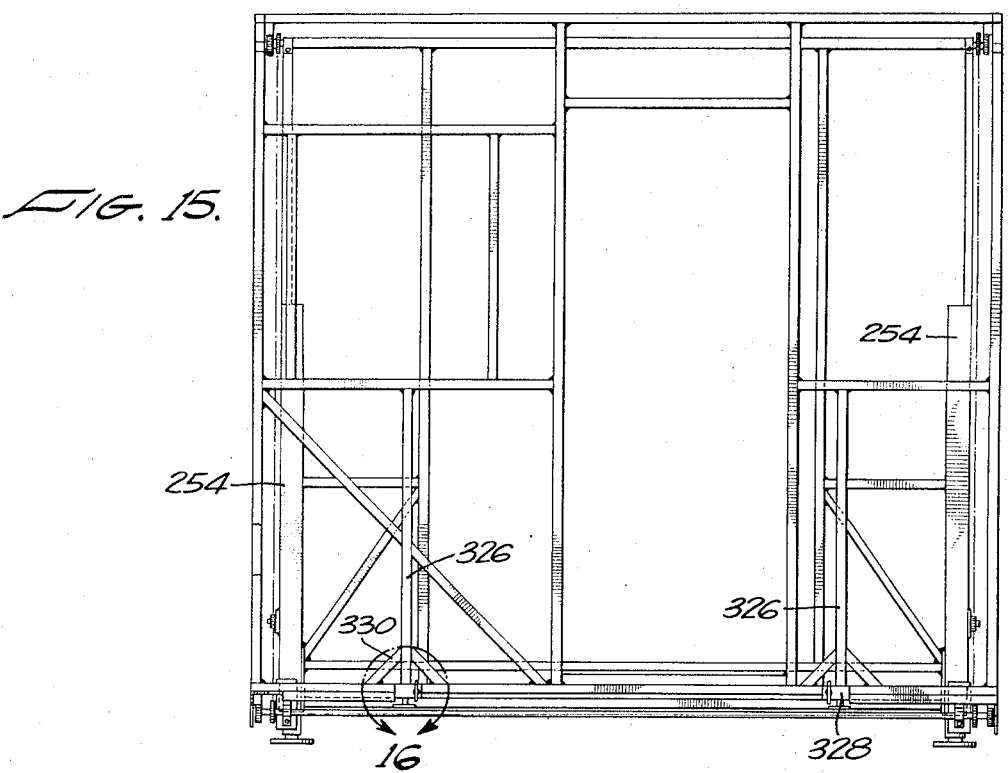
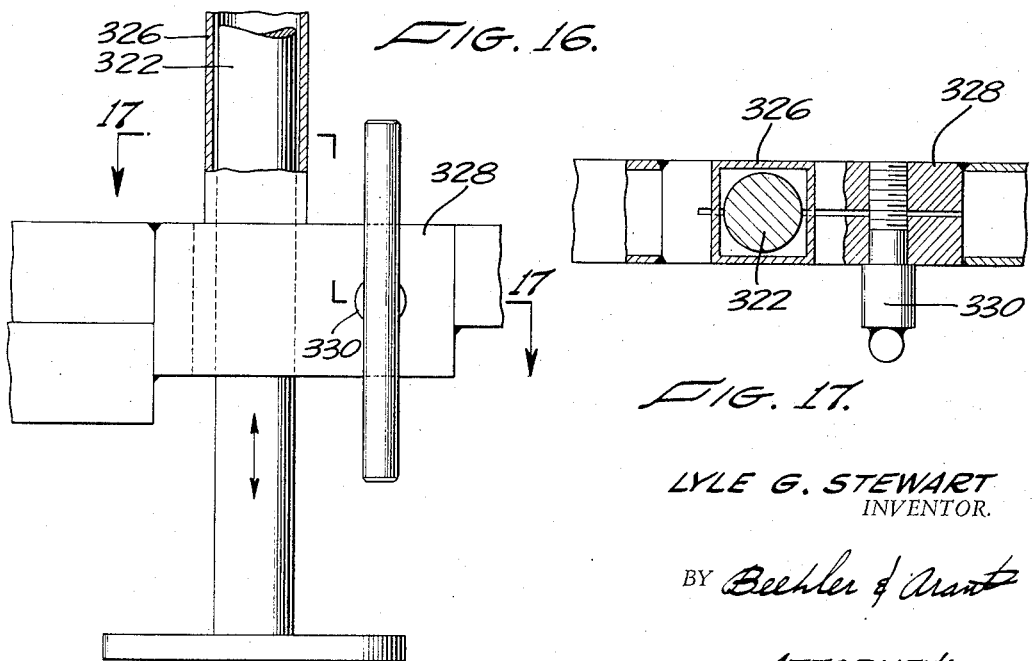
LYLE G. STEWART
INVENTOR.
BY Beehler & Arant
ATTORNEYS Feb. 13, 1968  L. G. STEWART  3,368,839
EXPANDABLE CAMPER
Filed March 4, 1966  11 Sheets-Sheet 8
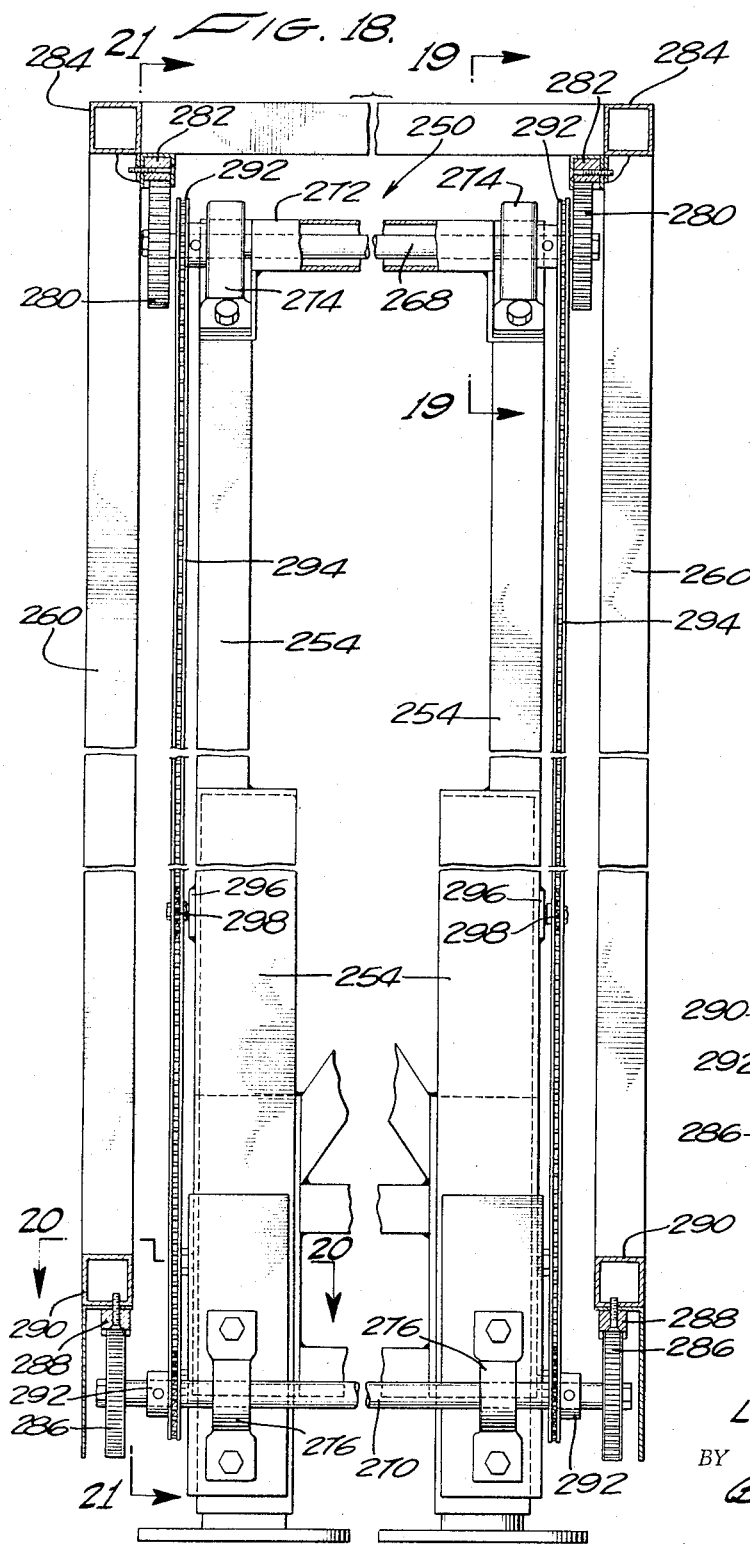
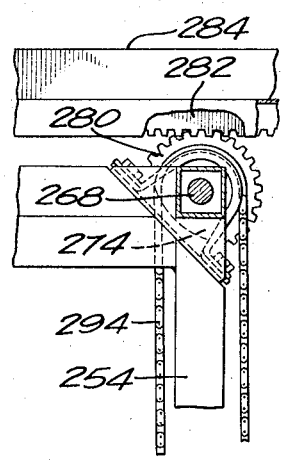
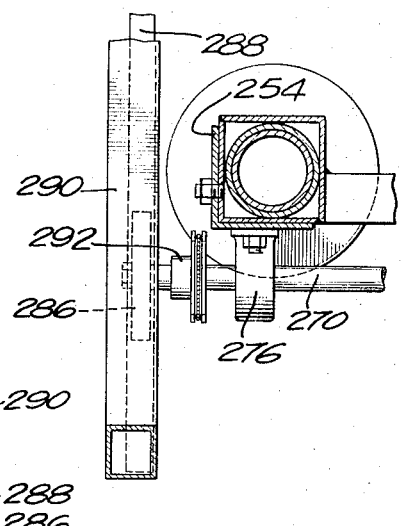
INVENTOR.
LYLE G. STEWART
BY Beehler & Arant
ATTORNEYS

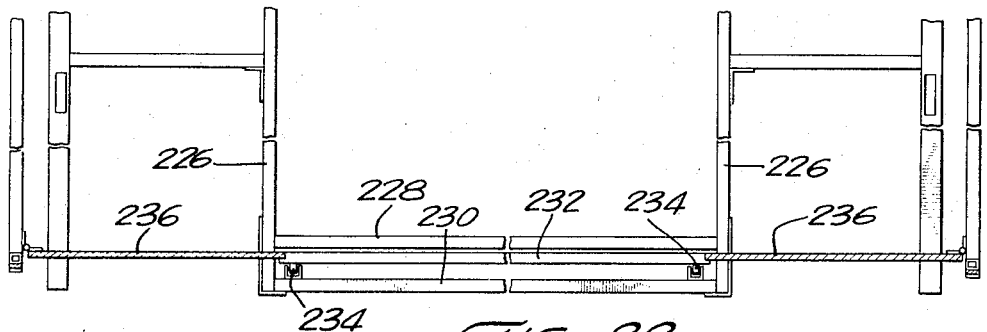
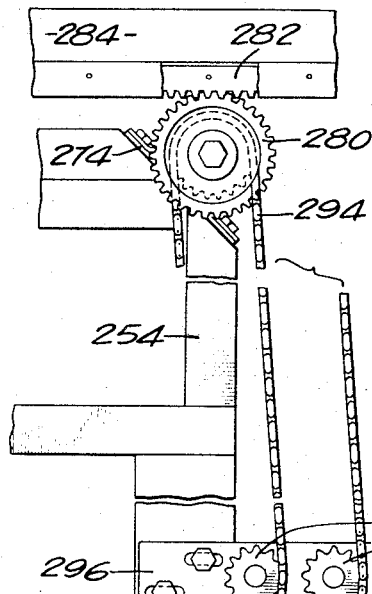
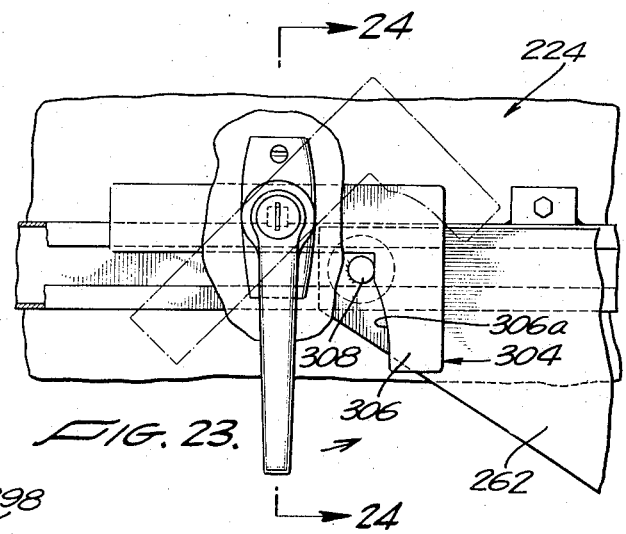
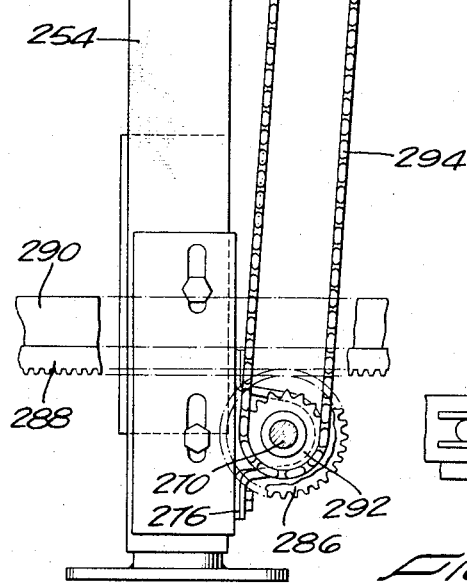
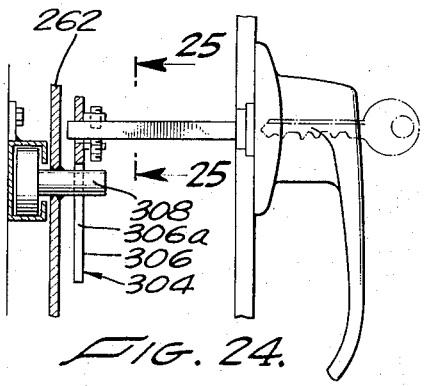

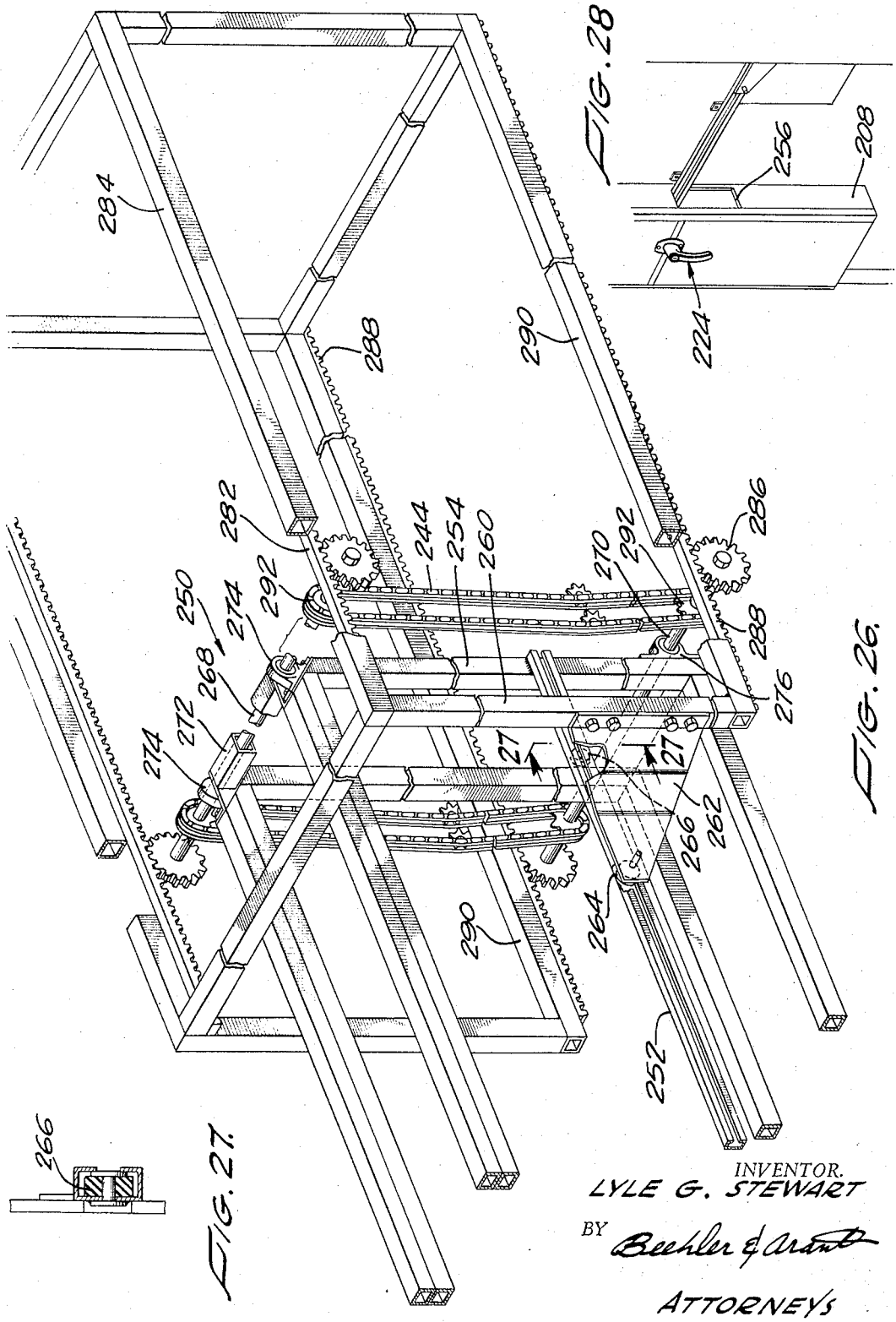

Feb. 13, 1968     L. G. STEWART     3,368,839
EXPANDABLE CAMPER

Filed March 4, 1966     11 Sheets-Sheet 11

INVENTOR.
LYLE G. STEWART
BY Beehler & Arant
ATTORNEYS

United States Patent Office 3,368,839
Patented Feb. 13, 1968

3,368,839
EXPANDABLE CAMPER
Lyle G. Stewart, Loma Linda, Calif., assignor to Glen M. Stewart, Auburn, Calif.
Continuation-in-part of application Ser. No. 333,609, Dec. 26, 1963. This application Mar. 4, 1966, Ser. No. 531,680.
19 Claims. (Cl. 296—23)

ABSTRACT OF THE DISCLOSURE

An expandable camper including a telescoping section which is transported in a telescoped or contracted position, and after the vehicle is stopped is extended and supported by jacks so as to increase the interior size of the camper.

---

This application is a continuation-in-part of my copending application Ser. No. 333,609, filed Dec. 26, 1963, now abandoned and entitled Extendible Camper.

This invention relates generally to improvements in mobile camping equipment commonly known as campers. The invention has more particular reference to a novel expandable camper.

Campers are well known in the art and typically comprise a cabin which is adapted to be carried on a vehicle, such as a pick-up truck, and is equipped with all the necessary facilities for outdoor living, such as beds, a stove, a refrigerator, table, lights, and the like. In some cases, the cabin of the camper is removable from the vehicle on which it is carried, thus to permit use of the vehicle for other purposes. In other cases, the cabin is permanently attached to the vehicle.

Many of the existing campers are deficient for the reason that their cabins have a fixed overall size which is limited by the size of the vehicle on which they are carried and which, as a result, is relatively small. In an effort to avoid this deficiency, various types of expandable campers have been devised. Most expandable campers comprise a cabin composed of telescoping sections which are relatively movable between telescoped positions of travel and extended positions of use. Some existing expandable campers, for example, are designed for vertical expansion and contraction. In this case, the cabin of the campers is equipped with upper and lower telescoping sections, the upper section being vertically movable relative to the lower section between a lower, telescoped position of travel and an upper extended position of use. Other expandable campers are designed for horizontal expansion and contraction. In this case, the cabin is composed of front and rear telescoping sections, the rear section being longitudinally movable relative to the front section between a forward, telescoped position of travel and a rear, extended position of use.

It is a general object of this invention to provide an improved expandable camper of this latter type.

A more specific object of the invention is to provide an expandable camper of the character described wherein the cabin is uniquely constructed to have minimum overall size in its collapsed or telescoped condition of travel and maximum interior living space in its extended or expanded condition of use.

Another objective of the invention is to provide an expandable camper of the character described wherein the rear cabin section is uniquely constructed and equipped with novel floor panels which may be removed or retracted to permit movement of the rear section to its telescoped position of travel and extended, or otherwise placed in operative position, when the rear section is extended to provide a floor surface across the entire width of the rear section.

Yet another object of the invention is to provide an expandable camper of the character described wherein the rear cabin section is supported on the front cabin section by novel cantilever type supporting means which are effective to permit smooth, unrestricted movement of the rear section between its telescoped and extended positions without binding.

A further object of the invention is to provide an expandable camper of the character described wherein the upper and lower portions of the telescoping cabin sections are drivably coupled in such a way as to effect unified relative longitudinal movement of these portions, thereby to prevent relative angular movement, and hence binding of the sections during relative longitudinal movement thereof.

Yet a further object of the invention is to provide an expandable camper of the character described equipped with hydraulic jacks which are uniquely arranged to support the front section of the cabin in an elevated position wherein the rear section may be freely moved between its telescoped and extended positions.

A related object of this invention is to provide an expandable camper according to the foregoing object wherein the hydraulic jacks may be utilized to lower the cabin of the camper into and elevate the cabin from the cargo space of its transporting vehicle, thereby to facilitate installation of the cabin on the vehicle as well as separation of the vehicle from the camper.

Another related object of the invention is to provide an expandable camper of the character described wherein the hydraulic jacks may be utilized to level the cabin of the camper.

A still further object of the invention is to provide an improved expandable camper of the character described which may be expanded and used for living purposes when the cabin of the camper is supported on its transporting vehicle as well as when the cabin is separated from the vehicle and supported on the ground.

An additional object of the invention is to provide an expandable camper of the character described which is equipped with unique latch means for locking the telescoping cabin sections in their extended positions of use and/or in their telescoped positions of travel, and wherein further the latch means for locking the cabin sections in their extended positions of use are uniquely constructed to cooperate with the cantilever supporting means for the sections in such a way as to maintain the sections in longitudinal alignment when extended.

Other objects of the invention are concerned with providing an expandable camper of the character described which is relatively simple in construction, pleasing in appearance, rugged, capable of long service life, immune to malfunctioning, and otherwise ideally suited to its intended purposes.

Additional objects, advantages, and features of the invention will become readily evident as the description proceeds.

With these and such additional objects in view, the invention consist in the construction, arrangement, and combination of various parts of the camper, whereby the several objects of the invention are attained as hereinafter set forth, pointed out in the appended claims, and illustrated in the accompanying drawings.

In these drawings:

FIGURE 3 is a side elevation of the camper and vehicle with parts of the camper broken away for the sake of clarity and illustrating the camper in its extended position of use;

FIGURE 4 is a section taken on line 4—4 in FIGURE 3;

FIGURE 5 is a view looking in the direction of the arrows on line 5—5 in FIGURE 3 with parts broken away for the sake of clarity;

FIGURE 6 is an enlarged section taken on line 6—6 in FIGURE 3;

FIGURE 7 is an enlarged fragmentary detail of the latch means embodied in the camper for locking the telescoping sections of the camper cabin in their extended positions of use;

FIGURE 8 is a section taken on line 8—8 in FIGURE 7;

FIGURE 9 is an enlarged section taken on line 9—9 in FIGURE 3;

FIGURE 10 is a section taken on line 10—10 in FIGURE 9;

FIGURE 11 is an enlargement of one of the jacks illustrated in FIGURE 5;

FIGURE 12 is a section taken on line 12—12 in FIGURE 11;

FIGURE 13 is an enlarged section taken on line 13—13 in FIGURE 4;

FIGURE 14 is a side elevation of a modified camper according to the invention with parts broken away for the sake of clarity and illustrating the camper installed on a transporting vehicle and telescoped for travel;

FIGURE 15 is a view looking in the direction of the arrows on line 15—15 in FIGURE 14;

FIGURE 16 is an enlargement of the area encircled by the arrow 16 in FIGURE 15, with parts broken away for the sake of clarity;

FIGURE 17 is a section taken on line 17—17 in FIGURE 16;

FIGURE 18 is an enlarged broken section taken on line 18—18 in FIGURE 14;

FIGURE 19 is a section taken on line 19—19 in FIGURE 18;

FIGURE 20 is an enlarged section taken on line 20—20 in FIGURE 18;

FIGURE 21 is a section taken on line 21—21 in FIGURE 18;

FIGURE 22 is an enlarged section taken on line 22—22 in FIGURE 14;

FIGURE 23 is a fragmentary detail of the latch means for locking the telescoping sections of the cabin camper in their telescoped positions of travel, which latch means are encircled by the arrow 23 in FIGURE 14;

FIGURE 24 is a section taken on line 24—24 in FIGURE 23;

FIGURE 25 is a section taken on line 25—25 in FIGURE 24;

FIGURE 26 is an enlarged, semi-diagrammatic perspective view of the frame structures of the telescoping cabin sections of the modified camper illustrating, in particular, the cantilever supporting means for the cabin sections and the means for effecting unified relative longitudinal movement of the upper and lower portions of these sections;

FIGURE 27 is an enlarged section taken on line 27—27 in FIGURE 26;

FIGURE 28 is a perspective view of the cabin section latch means in their unlatching or disengaged positions;

Figure 1:
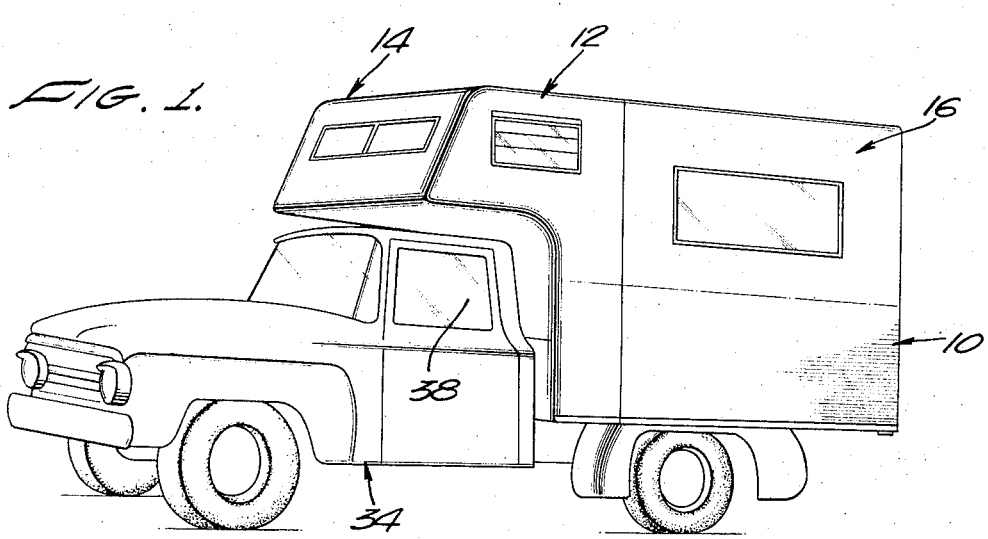
FIGURE 1 is a perspective view of a present camper installed on a pick-up truck and illustrating the camper in its telescoped or collapsed condition.

Generally speaking, the camper 10 which has been selected for illustration in FIGURES 1 through 13 of these drawings comprises a telescoping cabin 12 including a front section 14 and a rear section 16. The rear end of the front cabin section and the front end of the rear cabin section are open. The front cabin section 14 has a rear end portion 14a of generally uniform external rectangular configuration and a slightly enlarged front end portion 14b which defines an upper, forwardly projecting sleeping compartment 18 on the front section. The juncture of the rear and front end portions 14a, 14b of the front cabin section defines a rearwardly presented shoulder 20 which extends upwardly across the sides and horizontally across the top of the front cabin section. The open front end of the rear cabin section 16 telescopically receives the rear end portion 14a of the front cabin section 14.

Figure 2:
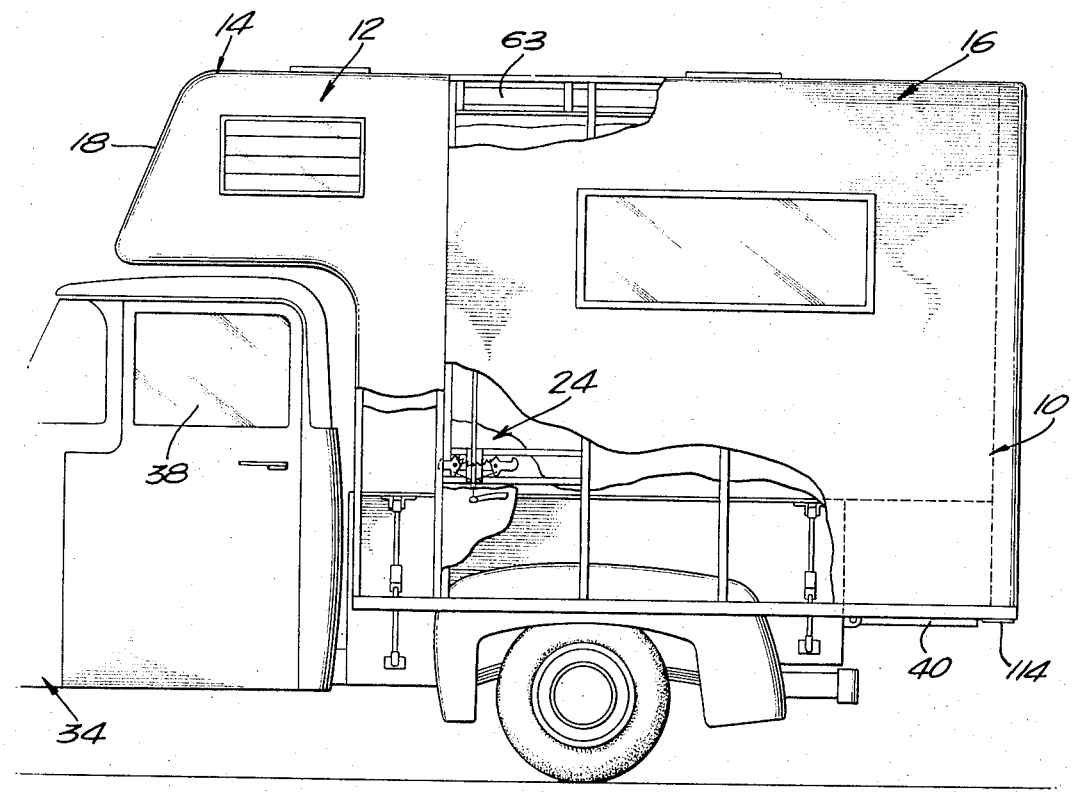
FIGURE 2 is an enlarged side elevation of the camper and vehicle in FIGURE 1, with portions of the camper broken away for the sake of clarity.

The front and rear cabin sections 14, 16 are mutually supported, by cantilever supporting means 22, for relative longitudinal movement between their collapsed or telescoped positions of travel illustrated in FIGURES 1 and 2 wherein the front edge of the rear cabin section abuts the shoulder 20 on the front cabin section, and their extended positions of use illustrated in FIGURE 3, wherein the rear cabin section extends rearwardly of the front cabin section and the rear end of the front section and front end of the rear section are disposed approximate to one another, as shown. The rear cabin section has an external, generally uniform rectangular configuration of approximately the same dimensions as the front portion 14b of the front cabin section. Accordingly, when the cabin sections occupy their telescoped positions of travel, the external surfaces of the sections are substantially flush. Preferably, a resilient sealing element is secured to the shoulder 20 on the front cabin section for providing a weather-tight seal between the sections when the latter are telescoped.

The front cabin section 14 has a lower, relatively narrow base 26 across which extends a floor 28. The rear cabin section 16 has a floor 30 which is secured along its rear edge to the rear end of the section. Floor 30 has substantially the same width as and extends forwardly into overlapping relation with the floor 28 of the front section. As it will appear presently, the front end of the rear section floor 30 is supported on the front cabin section 14 in such a way that this floor and the front section floor 28 undergo relative edgewise longitudinal movement during relative longitudinal movement of the cabin sections between their telescoped and extended positions. The sides of the rear cabin section 16 are disposed a distance outward from the base 26 on the front cabin section and the lower edges of these sides are disposed approximately in the plane of the rear section floor 30. Accordingly, when the cabin sections are extended to their positions of use, gaps or spaces exist between the lower edges of the sides of the rear cabin section and the side edges of the rear section floor. The present camper is equipped with floor panels 32 which are removably positionable in these spaces, thereby to provide a continuous floor surface across the entire width of the rear cabin section when the latter is extended.

Camper 12 is designed to be carried on a vehicle 34, such as a pick-up truck, having a rear open cargo space 36. To this end, the base 26 of the front cabin section is laterally and vertically dimensioned to fit within the vehicle cargo space 36 in the manner best illustrated in FIGURE 4. When the camper is installed on the vehicle, the front end of the camper is located adjacent the rear side of the driver's cab 38 of the vehicle and the sleeping compartment 18 of the camper projects over the cab, in the usual way. The camper is designed to have an overall length, when telescoped, somewhat greater than the length of a vehicle cargo space 36. Accordingly, when the camper is installed on the vehicle, the rear end of the camper extends beyond the rear end of the cargo space, as shown in FIGURE 2. It is thus necessary to lower the tailgate 40 of the vehicle to its position of FIGURE 2 before the camper is placed on the vehicle. The front cabin section 14 of the camper is secured to the vehicle in any conventional way as by straps or cables 42. When the camper is thus installed on the vehicle 34, the sides of the cabin 12 are located a small distance outward of the sides of the vehicle chassis. The sides of the rear cabin section 16 depend below the upper edges of the sidewalls of the vehicle cargo space 36 and alongside the rear fenders of the vehicle, as best shown in FIGURE 4.

When transporting the camper on the vehicle 34, the cabin 12 is locked, by means of the latch means 24, in its collapsed or telescoped condition of FIGURES 1 and 2. Upon arrival at a campsite, the latch means 24 are released and the rear cabin section 16 is pulled rearwardly relative to the front cabin section 14 to its extended position of FIGURE 3. The cantilever supporting means 22 supports the rear cabin section during this extension thereof. Thereafter, jacks 44 carried on the rear end of the rear cabin sections are lowered into supporting engagement with the ground to support the rear end of the latter section during occupancy of the camper. As will appear presently, the latch means 24 are also utilized to lock the cabin sections in their extended positions of use. In this case, the latch means cooperate with the cantilever supporting means 22 to restrain the cabin sections against relative vertical angular displacement. The camper is subsequently reconditioned for transportation on the vehicle 34 by elevating the jacks 44, releasing the latch means 24, and moving the rear cabin section 16 forwardly into telescoped relation with the front cabin section 14. Thereafter, the latch means 24 are re-engaged to lock the cabin sections in their telescoped positions.

Referring now in greater detail to the camper 10, the front cabin section 16 comprises upright sidewalls 46 and a top wall or roof 48 which extends between and is joined to the upper edges of the sidewalls 46. The lower portions of the sidewalls 46 are offset inwardly, as shown best in FIGURE 4, to define the lower, relatively narrow base 26 of the front cabin section. When the camper is installed on the vehicle 34, the horizontal stepped portions 50 of the sidewalls extend outwardly from the base 26 across the upper edges of the sidewalls of the vehicle cargo space 36. Extending between and joined to the lower edges of the sidewalls 52 of the front section base 26 is a bottom wall 54 which is spaced a distance below the floor 28 of the front cabin section. The front section sidewalls 46 have lower depending portions 56 which are disposed in the planes of the upper portions of the sidewalls and extend below the stepped sidewall portions 50 in space parallel relation to the sidewalls 52 of the front section base 26. Secured to the lower edges of the depending sidewall portions 56 are upwardly opening channels 58. The front end of the front cabin section 14 is closed by a front end wall 60 which turns forwardly, at its upper end, to form the bottom wall of the sleeping compartment 18 and then upwardly to form the front wall of this compartment. In accordance with customary practice, the walls of the front cabin section 14 comprise horizontal and vertical frame members 62, 63 which are rigidly joined to one another to form an open framework construction. The front cabin section is lined with plywood panels 64, or the like, which are secured to the inner surfaces of the frame members 62, 63. The exterior of the front cabin section is covered with a metal skin 66 which is secured to the outer surfaces of the frame members 62. Thermal insulation, and the like, is placed between the inner panel 64 and the outer skin 66 in the regions between the frame members 62. Each sidewall 46 of the front cabin section has a window 68.

The rear cabin section 16 comprises sidewalls 70 which are disposed outward of the front section sidewalls 46 and a top wall or roof 72 which is disposed above the roof 48 of the front cabin section. The rear end of the rear cabin section is closed by a rear upright end wall 74 having an access door 76. The walls of the rear cabin sections are constructed in the same way as the walls of the front cabin section. Accordingly, it is unnecessary to describe in detail the wall construction of the rear cabin section. The lower edges of the rear section sidewalls 70 terminate within the upwardly opening channels 58 on the front section sidewalls 46. These channels serve to seal the spaces between the confronting front and rear section sidewalls against the entrance therein of dirt, water, and the like in transit. Formed in the rear section sidewalls 70 are windows 78. Windows 78 are located to register with the window 68 in the front cabin section when the camper is in its telescoped position of travel.

The rear end of the floor 30 of the rear cabin section 16 is attached by screws 80 to the rear end wall 74 of the rear section. The front end of the floor 30 is disposed within the space between the floor 28 and bottom wall 54 of the front cabin section. Mounted on the base 26 of the front cabin section 14 below the rear section floor 30 are rollers 82 which support the latter floor for edgewise movement relative to the front section floor 28 during telescoping and extension of the cabin sections.

One longitudinal edge of each of the floor panels 32 is pivotally attached, by a hinge 84, to the lower edge of the adjacent rear section sidewall 70. The floor panels are rotatable about the axes of the hinges 84 between their retracted positions of travel illustrated in FIGURE 4 and their extended positions of use illustrated in FIGURE 6. In their retracted positions, the floor panels 32 are disposed in upright positions against the inner surfaces of the adjacent rear section sidewalls 70 and thus permit telescoping movement of the front and rear cabin sections 14, 16. In their extended positions of use, the floor panels are horizontally disposed in the plane of the rear section floor 30 and rest, along their inner edges, on this floor. In order to provide a smooth floor surface across the entire width of the rear cabin section, when the floor panels are thus extended, the side edges of the rear section floor are grooved, as shown, to receive the inner edges of the floor panels, thus to locate the upper surfaces of the panels flush with the upper surface of the floor.

The cantilever supporting means 22 for the cabin sections 14, 16 comprise a pair of longitudinal tracks which are rigidly mounted on and extend along the upper edges of the front section sidewalls 46. In the illustrative embodiment of the invention, these tracks comprise the upper horizontal frame members 63 of the sidewalls. Referring to FIGURE 10, it will be observed that each track 63 has a hollow, generally rectangular configuration and includes space parallel sidewalls 86, an upper wall 88, and lower, inwardly directed flanges 90 along the lower edges of the track sidewalls. Flanges 90 have upwardly directed lips 92 along their inner edges, which lips are spaced to define therebetween a slotlike opening 94. As may be observed in FIGURE 10, the tracks 63 are offset outwardly relative to the upright frame member 62 of the front section sidewalls 46 a distance such that the track slots 94 are disposed outward of these walls. Extending forwardly from the rear cabin section 16, inwardly and adjacent the upper edges of the rear section sidewalls 70, are rigid beams 96. Beams 96 have a generally T-shaped cross section and include outwardly directed flanges 98 along their lower edges. The beams are firmly attached to the rear cabin section by means of generally channel shaped hangers 100 which are secured to the frame structure of the rear cabin section and are welded or otherwise rigidly attached to the outwardly directed beam flanges 98, as shown. Beams 96 extend axially through the tracks 63 on the front cabin section. As shown in FIGURE 10, the lower, flanged edges of the beam webs extend through the lower track slots for attachment to the beam hangers 100. Rigidly secured to the front end of each beam 96 is a bracket 102 mounting upper and lower, longitudinally spaced rollers 104, 106. Th lower rollers 104 engage the upper surfaces of the track flanges 90. The upper rollers 106 engage the lower surfaces of the upper track walls 88. Mounted on the outer surfaces of the front section sidewalls 46, adjacent the rear upper corners of these walls, are rollers 108 on which ride the lower flanges 98 of the rear section beams 96. It is evident at this point, therefore, that the rear cabin section 16 is supported in cantilever fashion on the front cabin section 14 by the cantilever supporting means 22 for movement of the rear section between its telescoped and extended positions relative to the front section.

As noted earlier, the rear cabin section 16 carries rear jacks 44 for supporting the rear end of the rear section on the ground when the latter section is extended. Referring to FIGURES 11 and 12, it will be observed that each jack 44 comprises a vertical jack post 110 which is slideably supported in an axially slotted bearing sleeve 112 secured to the inner surfaces of the adjacent sidewall 70 and rear end wall 74 of the rear cabin section. The post 110 of each jack is vertically movable in its bearing sleeve 112 between an elevated or retracted position, shown in FIGURES 1 and 2, wherein a lower round engaging plate 114 on the post is substantially flush with the underside of the rear cabin section, and a lower extended position, shown in FIGURES 5 and 11, wherein the plate is disposed for supporting engagement with the ground. Associated with each jack 44 are lock means 116 for releasably locking the corresponding jack post 110 in its extended and retracted positions. The lock means 116 for each jack comprises a pair of racks 118 and 120 rigid on the inwardly facing side of the respective jack post 110, adjacent the upper and lower ends thereof. The axial slot in the bearing sleeve 112 for the post provides clearance for these racks during extension and retraction of the post. Rotatably mounted on the front surface of the rear end wall 74, adjacent each bearing sleeve 112, is a pinion 122 which is disposed to mesh with the racks 118, 120 on the adjacent jack post in the extended and retracted positions of the post. Also mounted on the wall 74, adjacent each pinion 122, is a detent mechanism 124 including a spring loaded detent 126. Detent 126 is normally extended into interlocking engagement with the adjacent pinion 122, as shown in FIGURE 11, to lock the pinion against rotation. Each detent is secured to a pivoted handle 128 on the rear side of the end wall 124 by means of a cable 129 which extends through an opening in the wall, whereby the detent may be retracted out of engagement with its pinion, to release the latter for rotation, by pulling rearwardly on the handle.

It is now evident, therefore, that the lock means 116 are effective to releasably lock the jack posts 110 in both their extended and retracted positions. The posts are released for extension and retraction by pulling rearwardly on the detent handles 128 to free the lock pinions 122 for rotation by the post racks 118, 120 during such extention and retraction of the posts. The jack posts will obviously drop from the retracted positions to their extended positions under the force of gravity when the post lock means 116 are thus released. The posts are manually raised to their retracted positions. It is further evident that the lock means 116 permit independent vertical adjustment of the jack posts, when extended, thereby to enable supporting engagement of both posts with uneven ground.

It would be recalled that the cabin sections 14, 16 may be locked in their extended and retracted positions by latch means 24. These latch means, which are best illustrated in FIGURES 3, 7 and 8, comprise a pair of upper and lower latch mechanisms 130, 132 mounted on the inner side of each rear section sidewall 70, adjacent the front edge of the wall. These latch mechanisms are identical and each includes a supporting bracket 134 welded or otherwise firmly attached to the frame members of the adjacent sidewall 70, as shown. Bracket 134 has a longitudinal plate 136 defining front and rear tongues 138, 140. Pivotally mounted on the front and rear ends of the latch plate are latch dogs 142, 144 which are identical in shape and define generally hook shaped latch arms 146 terminating in upwardly directed latch shoulders 148. The two latch dogs 142, 144 are reversed so that the latch arm 146 of the front latch dog 142 extends forwardly and the latch arm of the rear latch dog 144 extends rearwardly. In FIGURE 7, it will be observed that the forward end of the latch arm 146 on the front latch dog 142 projects forwardly of the front edge of the adjacent rear section sidewall 70. The front and rear tongues 138, 140 on the latch plate 136 projects slightly beyond the latch arms, as shown. Connected between the latch dogs 142, 144 and the latch bracket 134 are tension springs 150 which urge the dogs in directions to rotate their latch arms 146 upwardly, as viewed in FIGURE 7. Pivotal movement of the latch dogs in these directions, as well as in the opposite directions, is limited by limit stops 152 on the latch plate 136. The positions of the latch dogs illustrated in FIGURE 7 are hereinafter referred to as their latching positions. It is significant to note at this point that in these latching positions of the dogs, the latch shoulders 148 project above the upper edges of the latch plate tongues 138, 140, respectively. The latch dogs are rotatable against the action of the latch springs 150 to retracted positions wherein the upper extremities of the latch shoulders 148 are flush with or disposed below the upper edges of the latch plate tongues. The above described latch structure is obviously common to each of the latch mechanisms 130, 132.

Each sidewall 70 of the rear cabin section 16 carries latch dog retracting means 154 for simultaneously retracting the latch dogs 142, 144 of the adjacent upper and lower latch mechanisms 130, 132. Each latch dog retracting means 154 comprises a bushing 156 mounted in the adjacent sidewall 70 of the rear cabin section 16, a distance below the adjacent, lower latch mechanism 132. The axis of this bushing extends generally normal to the sidewall and is disposed in a vertical plane passing about midway between the front and rear latch dogs 142, 144 of the adjacent upper and lower latch mechanisms 130, 132. Journaled in the bushing 156 is a shaft 158 whose ends extend beyond the inner and outer surfaces of the adjacent rear section sidewall 70, as best shown in FIGURE 8. Fixed to the outer end of the shaft 158 is a handle 160. Fixed to the inner end of the shaft is a drum 162 around which are wound wire cables 164. These cables are secured, at one end, to the drum 162. The opposite ends of the cables are attached to the latch dogs 142, 144, respectively, of the adjacent upper and lower latch mechanisms 130, 132 in such manner that rotation of the drum 162 in one direction simultaneously retracts the latch dogs against the action of the latch springs. Rotation of the drum in the opposite direction releases the latch dogs for return thereof to their latching positions under the action of the latch dog springs.

It is now evident, therefore, that rotation of the handle 160 of each latch dog releasing means 154 in one direction is effective to simultaneously retract the latch dogs 142, 144 of the adjacent upper and lower latch mechanisms 130, 132. When the handle is released, the latch dogs are returned to their latching positions by the latch dog springs 150.

Each vertical portion of the rearwardly presented shoulder 20 on the front cabin section 14 has a pair of slots 166 (only one shown) for receiving the front latch plate tongues 138 and the latch arms 146 on the front latch dogs 142 of the adjacent upper and lower latch mechanisms 130, 132 when the rear cabin section 16 occupies its forward telescope position relative to the front cabin section 14, as best shown in FIGURE 7. During forward movement of the rear cabin section to its telescoped position, of course, the front latch dogs 142 are yieldably retained in their latching positions by their respective springs 150. As the rear cabin section approaches its forward, fully telescoped position, the illustrated rounded front edges on the front latch dog arms 146 engage the upper edges of the respective latch slots 166. This engagement produces a camming action on the front latch dogs 142 which rotates the dogs to their retracted positions, thereby permitting the dogs, and the front latch plate tongues 138 to enter the slots. Upon subsequent arrival of the rear cabin section at its forward, fully telescoped position relative to the front cabin section, wherein the front edge of the rear section is disposed in sealing engagement with the front section shoulder 20, the front latch dogs 142 are returned, by their springs 150, to their latching positions of FIGURE 7 wherein the front latch dog shoulders 148 are disposed in latching engagement with the upper edges of their respective latch slots 166, as shown, thereby to releasably lock the rear cabin section in its telescoped position. The rear cabin section is subsequently released for rearward extension thereof relative to the front section by rotation of the latch dog releasing handles 160 in directions to retract the front latch dogs 142.

Mounted on the outer surface of each front section sidewall 46, adjacent the rear edge of the wall, are a pair of plates 168 having slots for receiving the rear latch plate tongues 140 and the latch arms 146 on the rear latch dogs 144 of the adjacent upper and lower latch mechanisms 130, 132 when the rear cabin section 16 occupies its rear extended position relative to the front cabin section 14. During rearward extension of the rear cabin section, of course, the rear latch dogs 144 are yieldably retained in their latching positions by their respective springs 150. As the rear cabin section approaches its extended position, the illustrated rear rounded edges of the latch arms 146 on the rear latch dogs engage the upper edges of their respective latch slots in the latch plates 168. This engagement produces a camming action on the rear latch dogs which retracts these dogs against the action of their springs, thereby permitting the rear latch dog arms and the rear latch plate tongues to enter the rear latch plate slots. Upon arrival of the rear cabin section in its fully extended position, the rear latch dog springs 150 return the rear latch dogs 144 to their latching positions of FIGURE 3, wherein the latch shoulders 148 on these dogs are disposed in latching engagement with the upper edges of their respective rear latch plate slots, thereby to releasably lock the rear cabin section in its fully extended position.

It is significant to note at this point that when the rear cabin section 16 is fully extended with the rear jacks 44 retracted, the weight of the rear cabin section produces a moment on this section in a direction to cause forward movement of the rear latch mechanisms 132 relative to the rear, lower latch plates 168. This moment, of course, is resisted by the cantilever supporting means 22 for the rear cabin section. It is further evident, however, that this moment is further resisted by the rear latch dogs 144 of the lower latch mechanisms 132 when these latch dogs are disposed in latching engagement with the rear lower latch plates 168. Thus, the lower latch mechanisms 132 cooperate with the cantilever supporting means 22 to resist the moment produced on the rear cabin section 16 when the latter is fully extended with the rear jacks 44 retracted.

Now assume that the rear cabin section is fully extended with the jacks 44 disposed in supporting engagement with the ground. In this case, a vertical load acting on the cabin 12, in line with the overlapping ends of the front and rear cabin sections, tends to deflect these ends downwardly relative to the front end of the front cabin section and the rear end of the rear cabin section. It is obvious, therefore, that this vertical load produces a moment on the cabin sections which tends to move the upper latch mechanisms 130 and latch plates 168 away from one another. This moment is also resisted by the cantilever supporting means 22 for the rear cabin section. The moment is further resisted by latching engagement of the rear latch dogs 144 of the upper latch mechanisms 130 with the upper latch plates 168. Accordingly, latching engagement of the upper latch mechanisms 130 with the upper latch plates 168 cooperates with the cantilever supporting means 22 to resist the buckling moment produced on the cabin 12 when the latter is extended with the jacks 44 disposed in supporting engagement with the ground.

It is now evident, therefore, that the upper and lower latch mechanisms 130 and 132 cooperate with the cantilever supporting means 22 to restrain the cabin sections 14 and 16 against relative vertical deflection or angular movement when the rear cabin section is extended.

In order to prevent the entrance of water and dirt into the cabin 12, as well as to prevent escape of heat from the cabin, when the latter is extended, it is desirable to seal the cabin sections to one another. To this end, a seal of weatherstrip 170 (FIGURE 13) is secured to the inner surfaces of the side and top walls of the rear cabin section and is disposed in sliding engagement with the outer surfaces of the side and top walls of the front cabin section, as shown.

It is now evident that the cabin 12 of the camper 10 may be telescoped for travel and extended for use. In its telescoped condition of FIGURES 1 and 2, the cabin has a minimum overall length which adapts the cabin for transportation on a vehicle, such as the pick-up truck 34 illustrated. In its extended position of FIGURE 3, the cabin has maximum length and, therefore, maximum interior living space. The latch means 24 are effective to releasably lock the cabin in both its telescoped and extended conditions. These latch means also cooperate with the cantilever supporting means 22 to reinforce the cabin against buckling in its extended condition.

Reference is now made to FIGURES 14 through 32 illustrating a modified expandable camper 200 according to the invention. Camper 200, like the earlier described camper, comprises a telescoping cabin 202 including front and rear cabin sections 204 and 206, respectively. The front cabin section 204 has front and rear portions 204a, 204b of generally rectangular external configuration. The rear portion 204b of the front section is somewhat smaller, in its external dimensions, than the front portion 204a. The juncture of the front and rear portions 204a, 204b defines a rearwardly presented shoulder 208 which extends upwardly across the sidewalls 210 and horizontally across the top wall 212 of the front cabin section. Preferably, a resilient seal or gasket is secured to the shoulder 208. The front portion 204a of the front cabin section defines an elevated, forwardly projecting sleeping compartment 214. The rear end of the front cabin section is open.

The rear cabin section 206 has an external, generally rectangular configuration and includes sidewalls 216, a top wall 218, and a rear end wall 220. The front end of the rear cabin section is open and telescopically receives the reduced, rear end portion 204b of the front cabin section 202.

Figure 29:
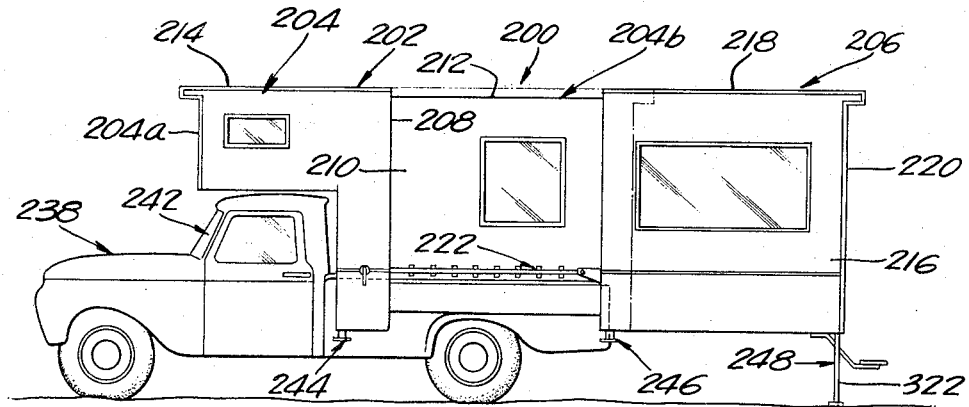
FIGURE 29 is a side elevation, on reduced scale, of the modified camper and its transporting vehicle illustrating the manner in which the camper may be expanded for use while supported on the vehicle.
Figure 30:
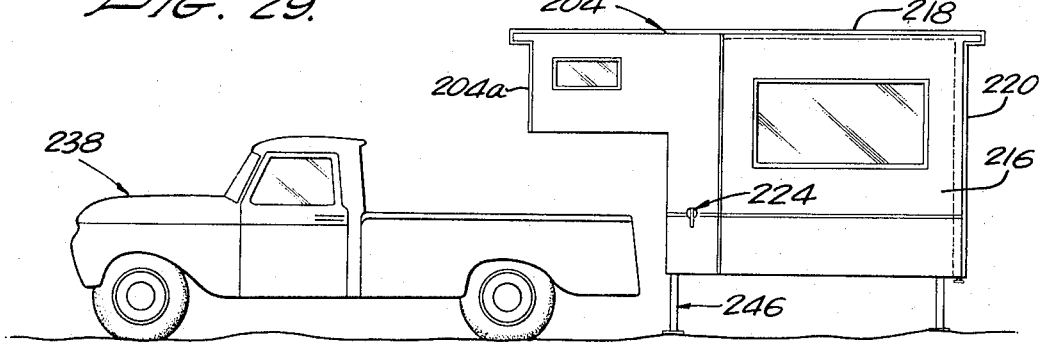
FIGURE 30 illustrates the camper detached from the vehicle and supported on the ground to free the vehicle for normal use.
Figure 32:
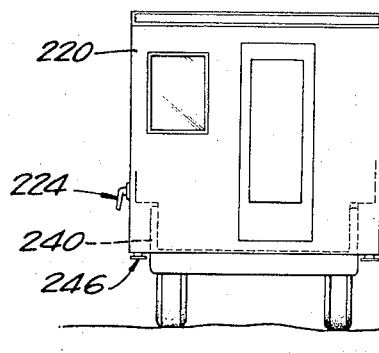
FIGURE 32 is a rear end view of the camper in FIGURE 30.

The front and rear cabin sections 204, 206 are mutually supported, by cantilever supporting means 222, for relative longitudinal movement between extended positions of use, illustrated in FIGURE 29, wherein the rear cabin section extends rearwardly of the front cabin section, and telescoped positions of travel, illustrated in FIGURE 30, wherein the front edge of the rear section abuts the shoulder 208 on the front section. Latch means 224 are provided for releasably locking the cabin section in this telescoped position. The external dimensions of the rear cabin section are approximately the same as the external dimensions of the front portion 204a of the front cabin section. Accordingly, when the cabin sections are telescoped, the external surfaces of these sections are substantially flush, as in the earlier form of the invention. The sidewalls of the front and rear cabin sections have windows, as shown. The sidewall windows on the rear cabin section are located to register with the sidewall windows on the front cabin section, when these sections are telescoped. As shown in FIGURE 32, the rear end wall 220 of the rear cabin section has an access door and a window.

The lower portions of the sidewalls 210 on the front cabin section 204 are offset inwardly to define a relatively narrow base 226 on this section between the lower portions of the rear section sidewall 216. Extending across the lower side of the base 226 are a floor 228 and the bottom wall 230. A floor 232 is secured along its rear edge to and extends forwardly from the rear end wall 220 of the rear cabin 206 into the space between the front section floor 228 and bottom wall 230. The front end of the rear section floor 232 is supported on rollers 234 mounted on the upper surface of the bottom wall 230. Hinged to the lower edges of the rear section sidewalls 216 are retractable floor panels 236. As in the previous embodiment of the invention, when the cabin sections 204, 206 are extended, these floor panels may be rotated to their horizontal extended positions of FIGURE 22, wherein the inner edges of the panels are supported on the grooved longitudinal edges of the rear section floor 232 to provide a continuous floor surface across the rear cabin section. The floor panels are rotatable to upright retracted positions against the inner surfaces of the rear section sidewalls 216 to permit telescoping of the cabin sections.

Cabin 202 is adapted to be carried on a vehicle 238 having a rear open cargo space 240 and a front driver's cab 242. When the cabin is installed on the vehicle, the front section base 226 fits within the cargo space 240 and the lower portions of the rear section sidewalls 216 are disposed outboard of the sides of the vehicle, as before. The sleeping compartment 214 on the cabin extends forwardly over the driver's cab. The front cabin section 204 is removably attached to the vehicle by means (not shown) to permit removal of the cabin 12 from the vehicle, thus to release the vehicle for normal use. The front cabin section carries hydraulic jacks 244 and 246 which may be used in the manner hereinafter explained to install the cabin on and separate the cabin from the vehicle 238, as well as to support the cabin in a level position on the ground. The rear cabin section 206 carries rear jacks 248 for supporting the rear end of the rear section on the ground when the latter section is extended.

Figure 31:
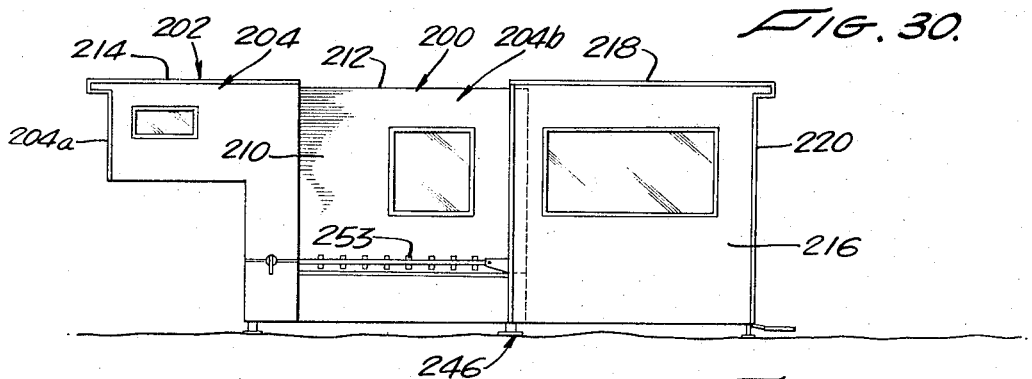
FIGURE 31 illustrates the detached camper of FIGURE 30 in its extended position of use.

At this point, therefore, it is evident that the modified camper 200, as it is thus far described, is basically similar to the earlier described camper of the invention and differs from the latter camper essentially only in the arrangement and construction of the cantilever support means 222, latch means 224, and jacks 244, 246, and 248. When the camper 200 is installed on the vehicle 238, the rear cabin section 206 of the camper may be moved longitudinally relative to the front cabin section 204 between its extended position of use, shown in FIGURE 29, and its telescoped position of travel shown in FIGURE 14. When the rear cabin section is extended, the rear jacks 248 may be extended downwardly into supporting engagement with the ground, thus to support the rear cabin section in its extended position. In contrast to the earlier embodiment of the invention, the front and center jacks 244, 246 on the camper can be hydraulically extended into supporting engagement with the ground while the camper is mounted on the vehicle 238, thus to remove at least a portion of the weight of the cabin 12 from the vehicle springs as well as to minimize or eliminate bouncing the cabin when occupied. In further contrast to the earlier embodiment of the invention, the jacks 244, 246 can be extended to elevate the cabin clear of the vehicle and thereby permit the latter to be driven out from under the cabin, as shown in FIGURE 29. It is evident that the vehicle may thus be separated from the cabin when the latter is in either its extended or telescoped condition. Preferably, however, the cabin is separated from the vehicle while locked in its telescoped condition, as shown in FIGURE 30, and is thereafter extended for use while supported on the ground. In this regard, a significant feature of the invention resides in the fact that the cabin sections 204, 206 are so weighted that the rear cabin section can be extended in cantilever fashion while the front cabin section is supported in an elevated position on the ground by means of the front and center jacks 244, 246. Thereafter, the rear jacks 248 are extended to support the rear cabin section on the ground. The several jacks may be vertically adjusted independently or in unison to level the cabin at any desired elevation regardless of the contour of the ground. If desired, the bottom of the cabin may rest directly on the ground, although it is generally desirable to locate the cabin in a slightly elevated position, as shown in FIGURE 31.

The modified camper 200 of FIGURES 14 through 32 possesses a significant improvement over the earlier described camper invention. This improvement resides in the fact that the cantilever supporting means 222 for the front and rear cabin sections 204, 206 embodies coacting drive means 250 (FIGURE 26) on the cabin sections for effecting unified relative longitudinal movement of the upper and lower portions of these sections during telescoping and extension thereof. As will appear presently these coacting drive means are provided to retain the cabin sections in longitudinal alignment and prevent binding of the sections during relative telescoping and extensile movement thereof.

Referring now in greater detail for the camper 200, it will be observed that the walls of the cabin 202 have the same basic frame construction as the cabin walls of the earlier camper. Accordingly, it is unnecessary to describe the construction of these walls in detail. Suffice to say that the walls of the cabin 202 may be internally covered with plywood panels, or the like, externally covered by a skin of aluminum or other suitable material, and insulated by thermal insulation disposed within the wall space between the wall frame members.

The cantilever supporting means 222 comprises, in addition to the coacting drive means 250, a pair of longitudinal tracks 252 secured by brackets 253 to the outer surfaces of the front section sidewalls 210, respectively. just above the lower, inwardly offset portions of these walls. As may be best observed in FIGURE 26, the rear ends of these tracks are secured to rear upright frame members 254 of the front cabin section 204. The front ends of the tracks 252 are secured to upright frame members (not shown) on the front end of the front cabin section. As best shown in FIGURE 28, the front end portion of each track extends through a slot 256 in the shoulder 208 on the front cabin section. Each track 252 comprises a hollow rectangular channel having a longitudinal slot 258 opening through its outwardly facing sidewall. Rigidly attached to and extending forwardly from the front vertical frame members 260 of the rear section sidewalls 216 are brackets 262. Each bracket 262 is vertically aligned with the adjacent track 252 and mounts, at its inner side, a roller 264 which rolls along the interior of the adjacent track. The tracks 252, brackets 262, and rollers 264 thus vertically support the front end of the rear cabin section 206 on the front cabin section 204 for longitudinal movement of the rear section relative to the front section. Rearward extension of the rear cabin section is limited by fixed limit stops 266 (FIGURE 27) mounted within the rear ends of the tracks 252.

Referring now to FIGURES 18, 19, 21, and 26, it will be observed that the coacting drive means 250 embodied in the cantilever supporting means 222 comprise upper and lower horizontal drive shafts 268 and 270 which extend across the rear end of the front cabin section. The upper shaft 268 extends through the rear upper cross frame member 272 of the front section and is rotatably supported adjacent its ends in bearings 274 mounted at the ends of the latter frame member. The lower shaft 270 is rotatably supported adjacent its ends in bearings 276 mounted on the lower ends of the rear upright frame members 254 of the front cabin section. Shaft 270 is located below the rear section floor 232 and thus clears the latter floor for fore and aft edgewise movement with the rear cabin section. Fixed on the outboard ends of the upper shaft 268 are pinions 280 which are disposed below and mesh with gear racks 282 rigidly mounted below and inwardly of the upper longitudinal side frame members 284 of the rear section sidewalls 216. Fixed to the outboard ends of the lower shaft 270 are pinions 286 which are disposed and mesh with gear racks 288 rigidly mounted below and inwardly of the lower longitudinal side frame members 290 of the rear section sidewalls. Racks 282, 286 in addition to meshing with the shaft pinions 280, 286, are disposed in vertical supporting engagement with these pinions. Pinions 280, 286, therefore, serve, in effect, as rollers which vertically support the rear cabin section rearwardly of the forward rollers 264 on the rear section.

It is evident at this point, therefore, that the supporting means 222 supports the rear cabin section 206 in cantilever fashion on the front cabin section 204 for relative longitudinal movement of the rear section between its extended and telescoped positions relative to the front section.

Fixed to the upper and lower drive shafts 268, 270 between their respective bearings and pinions, are sprockets 292. Sprocket chains 294 are trained about these sprockets. Drive shafts 268, 270 are thus driveably coupled by the sprocket chains 294 for rotation of the shafts in unison. It is evident, therefore, that during relative longitudinal movement of the rear cabin section 206 between its extended and telescoped positions with respect to the front cabin section 204, the coacting drive means 250 are effective to produce unified relative movement of the top and bottom of the rear section with respect to the front section, thus to retain the rear section in accurate longitudinal alignment with the front section and prevent binding of the rear section. Adjustably mounted on the rear upright frame members 254 on the front cabin section are brackets 296 which support idler sprockets 298 engagable with these sprocket chains 294. The sprocket brackets 296 are adjustable to establish and maintain the proper tension in these sprockets chains.

The forward roller brackets 262 on the rear cabin section 206 are dimensioned to fit within the shoulder slots 256 on the front cabin section 204 when the cabin sections are telescoped. As noted earlier, the cabin sections may be locked in this telescoped position by the latching means 224. Referring to FIGURES 23, 24, and 25 it will be observed that the latch means 224 comprises a latch handle 300 which is rotatably mounted on one sidewall 210 of the front cabin section at the level of the adjacent sidewall track 222 and just forwardly of the front section shoulder 208. If desired, the latch handle may be equipped with a key lock for locking the handle against rotation. Fixed to the latch handle 300, coaxial with its axis of rotation, is a shaft 302 which extends through the adjacent front section sidewall 210 to a position wherein the inner end of the shaft just clears the adjacent front roller bracket 262 on the rear cabin section when the latter occupies its telescoped position with respect to the front cabin section. Fixed to the inner end of the shaft 302 is a generally L-shaped latch bar 304 having a rear latch arm 306. Latch bar 304 is rotatable, by rotation of the latch handle 300, between its solid line latching position of FIGURE 23, wherein the latch on 306 is disposed in latching engagement with a latch pin 308 on the adjacent roller bracket 262, thus to lock the rear cabin section in its telescoped position and its phantom line retracted or unlatching position, wherein the latch arm 306 clears the latch pin 308 to release the rear cabin section for extension thereof. Preferably, the latch pin engaging edge 306a of the latch arm 306 is shaped, as shown in FIGURE 23, to produce a camming action on the latch pin 308 which draws the front end of the rear cabin section tightly against the seal on the front section shoulder 208 when the latch on 304 is rotated to its latching position.

Referring now to FIGURES 14, 18, and 20 it will be observed that the front and center hydraulic jacks 244, 246 comprise hydraulic cylinders 310 and piston rods 312 movable in the cylinders. Fixed to the outer ends of the rods 312 are ground engaging pads 314. The cylinders 310 of the front jacks 244 are disposed within the front upright frame members 315 on the front cabin section 204. The cylinders of the center jacks 246 are disposed within the rear upright frame members 254 on the front cabin section. The piston rods 312 of these jacks are retractable upwardly in the cylinders to positions wherein the ground engaging pads 314 on the rods are substantially flush with the underside of the cabin 12. Mounted within the rear end of the front cabin section is a hydraulic pump 316 which is connected, by hydraulic hoses 318, to the upper ends of the jack cylinders 310. The pump is connected to a hydraulic fluid reservoir (not shown) through a hydraulic hose 320.

It is evident at this point that operation of the pump to deliver hydraulic fluid under pressure to the jack cylinders 310 is effective to extend the jack rods 312 downwardly. The illustrated hydraulic jacks are single acting, whereby the jack rods 312 must be manually raised to their retracted positions. If desired, however, double acting hydraulic jacks may be employed. Associated with the pump 316 are valve means (not shown) for communicating the upper ends of the jack cylinders 310 to the hydraulic fluid reservoir during manual raising of the jacks. The hydraulic pump 316 is shown to be manually operated. If desired, however, a motor operated pump may be employed.

The rear jacks 248 on the rear cabin section 206 are manually operated and comprise posts 322 mounting ground engaging pads 324 at their lower ends. As shown best in FIGURES 15, 16 and 17, each jack post 322 extends upwardly through a rear upright frame member 326 on the rear cabin section. The lower ends of these frame members rest on a rear horizontal frame member 328 of the rear cabin section and are secured to the latter frame member by means of gussets 330. Jack posts 322 extend through the frame member 328. As shown best in FIGURE 17, a frame member 328 is longitudinally slotted in the regions of the jack posts 322 and mounts clamp screws 330 which may be tightened to firmly clamp the jack post 322 against vertical movement.

It is now evident that the rear cabin section 206 may be telescoped and extended relative to the front cabin section 204 while the camper 200 is supported on its transporting vehicle 238. The coacting drive means on the cabin sections retains the rear section in longitudinal alignment with the front section and prevent binding of the rear section during this relative longitudinal movement thereof. When the camper is to be occupied while supported on the vehicle, it is preferable to lower the hydraulic jacks 244, 246 into supporting engagement with the ground in order to remove at least a portion of the weight of the camper from the vehicle spring and minimize or eliminate bouncing of the camper. The rear jacks 248, of course, are extended into supporting engagement with the ground to support the rear cabin section in its extended position. It is evident that this ability of the camper 200 to be occupied while mounted on its transporting vehicle 238 is desirable for short periods of time. In the event of an extended stay at a campsite, it is preferable to remove the camper from the vehicle, thus to free the vehicle for other use. In this case, the hydraulic jacks 244, 246 are extended to elevate the cabin 202 from the vehicle, after which the vehicle may be driven out from under the cabin, as shown in FIGURE 30. Thereafter, the cabin may be extended for use, as shown in FIGURE 31, and then leveled at the desired elevation by appropriate operation of the jacks.

It is now apparent, therefore, that the invention herein described and illustrated is fully capable of obtaining the several objects and advantages preliminarily set forth.

While certain presently preferred embodiments of the invention have been disclosed for illustrative purposes, it is obvious that various modifications in the design, arrangement of parts, and instrumentalities of the invention are possible within the spirit and scope of the following claims:

What is claimed as new in support of Letters Patent is:

1. An expandable camper adapted to be carried on a vehicle having a chassis defining a rear open cargo space bounded by upstanding chassis side walls, comprising:
    a telescoping cabin including a front cabin section having an open rear end and a rear cabin section having an open front end telescopically receiving the rear end of said front section,
    co-acting means on said cabin sections supporting said sections for relative longitudinal movement between telescoped positions of travel and extended positions of use,
    said front cabin section including upright sidewalls with inwardly stepped lower portions and a floor extending between and joined to said inwardly stepped wall portions adjacent the lower edges thereof to define on said front section a relatively narrow base dimensioned to fit closely within said vehicle cargo space.
    said rear cabin section including upright sidewalls located outward of said front section sidewalls and having their lower edges disposed adjacent the plane of said front section floor,
    said inwardly stepped portions of said front section side walls and the lower portions of said rear section sidewalls defining therebetween relatively wide forwardly and downwardly chassis clearance gaps, whereby said cabin is adapted to be mounted on said vehicle with said front section base positioned within said cargo space, said rear section sidewalls disposed laterally outward of and extending downwardly along opposite sides of said vehicle chassis, and said chassis side walls disposed within said clearance gaps to permit telescoping movement of said rear cabin section relative to said front cabin section between said telescoped and extended positions while said cabin is mounted on said vehicle, and
    floor means operatively associated with said rear cabin section for providing a floor which extends across the entire width of said rear cabin section and between said lower edges of said rear section sidewalls when said rear cabin section is extended to said position of use.

2. A camper according to claim 1 wherein:
    said rear cabin section includes an upright rear end wall, and
    said floor means comprises a floor joined along its rear edge to said end wall and extending forwardly therefrom into overlapping relation with said front section floor, whereby said floors undergo relative fore and aft edgewise movement during relative longitudinal movement of said cabin sections, means on said front cabin section movably supporting said rear section floor for fore and aft edgewise movement relative to said front cabin section, there being spaces between the side edges of said rear section floor and said lower edges of said rear section sidewalls when said cabin sections are extended, floor panels removably positionable in said spaces, and means for supporting said panels on said rear section floor and the lower edges of said rear section sidewalls, respectively.

3. A camper according to claim 2 wherein:
    said floor panel supporting means comprise hinges pivotally connecting said floor panels to said rear cabin section for swinging between extended positions of use wherein said panels are disposed in said spaces, respectively, and retracted positions of travel wherein said panels clear said spaces to permit telescoping movement of said rear cabin section relative to said front cabin section.

4. A camper according to claim 1 wherein:
    said rear cabin section includes an upright rear end wall, and
    said rear section floor means comprise a floor joined along its rear edge to and extending forwardly from said rear end wall into overlapping relation with said front section floor, whereby said floors undergo relative fore and aft edgewise movement during relative longitudinal movement of said cabin sections, means on said front cabin section movably supporting said rear section floor for fore and aft edgewise movement relative to said front cabin section, there being spaces between the side edges of said rear section floor and said lower edges of said rear section sidewalls when said cabin sections are extended, and floor panels hinged to the lower edges of said rear section sidewalls, respectively, for swinging movement between extended positions of use wherein said panels are disposed in said spaces, respectively, with their inner edges supported on said rear section floor and upright positions of travel wherein said panels are disposed against the inner surfaces of said rear section sidewalls to permit telescoping movement of said cabin sections.

5. A camper according to claim 1 wherein:
    said rear cabin section has an upstanding rear end wall, and
    said rear section floor means comprises a floor joined along its rear edge to and extending forwardly from said rear end wall into overlapping relation with said front section floor, whereby said floors undergo relative fore and aft edgewise movement during relative longitudinal movement of said cabin sections, the front end of said rear section floor being disposed below said front section floor, and means on said front cabin section movably supporting said rear section floor on said front section for fore and aft edgewise movement relative to said front section.

6. A camper according to claim 5 wherein:
    said front section base has a bottom wall spaced below said front section floor and extending between and joined to the lower edges of said lower stepped portions of said front section sidewalls and said rear section floor is disposed between said front section floor and said bottom wall.

7. An expandable camper adapted to be carried on a vehicle having a rear open cargo space, comprising:
    a telescoping cabin including a front section having an open rear end and a rear section having an open front end,
    the open end of one of said cabin sections being telescopically disposed within the open end of the other cabin section, whereby said one cabin section constitutes an inner section and said other cabin section constitutes an outer section,
    said rear cabin section being longitudinally movable between a telescoped position of travel and an extended position of use relative to said front cabin section,
    said cabin sections having upright sidewalls and the sidewalls of said outer section being disposed outward of the sidewalls of said inner section, whereby the adjacent sidewalls have confronting sides,
    track means secured to said sides of the sidewalls of one cabin section and extending longitudinally of said sections, first roller means mounted on the sidewalls of the other cabin section and disposed in vertical supporting engagement with the adjacent track means, respectively, adjacent the open end of said outer cabin section throughout the range of travel of said rear section between said positions, and second roller means mounted on one cabin section and disposed in vertical supporting engagement with the other cabin section adjacent the open end of said inner cabin section throughout said travel range of said rear cabin section, whereby said track means and roller means cooperate to support said rear cabin section in cantilever fashion for relative longitudinal movement between said telescoped position of travel and extended position of use.

8. A camper according to claim 7 wherein:

said track means are secured to the outed sides of said inner section sidewalls, the opposite end of said inner cabin section is externally enlarged to substantially the same external dimensions as said outer cabin section, whereby said opposite end of said inner cabin section has a shoulder facing the open end of the latter section and extending upwardly across the sidewalls and horizontally across the top of said latter section, said outer cabin section includes supporting means for said first roller means, said roller supporting means being secured to said outer cabin section sidewalls, respectively, and extending beyond the open end of said outer cabin section, and said inner cabin section shoulder has openings for receiving said roller supporting means when said rear cabin section occupies its telescoped position of travel relative to said front cabin section.

9. A camper according to claim 7 wherein:

said track means are secured to the outer sides of said inner section sidewalls and comprise hollow tracks, said outer cabin section includes rigid longitudinal beam-like members secured to the side walls of and having free ends extending beyond the open end of said outer cabin section, and said first roller means comprise rollers mounted on the free ends of said beam-like members and disposed in rolling engagement with the interior surfaces of said tracks, respectively.

10. A camper according to claim 9 wherein:

said outer cabin section includes an open frame structure and said beam-like members comprise frame members of said frame structure.

11. A camper according to claim 7 wherein:

said track means are secured to the outer sides of said inner section sidewalls and comprise hollow tracks having longitudinal slots in their outer sides, said outer cabin section includes brackets secured to the side walls and having free ends extending beyond the open end of the latter section, and said first roller means comprise rollers disposed within and in rolling engagement with said tracks, respectively, and having shafts extending outwardly through said track slots and secured to the free ends of said brackets, respectively.

12. A camper according to claim 7 wherein:

said inner and outer cabin sections comprise said front and rear cabin sections, respectively.

13. A camper according to claim 7 including:

co-acting releasable latch means mounted on the sidewalls of said cabin sections adjacent the top and bottom of said sections for releasably locking said cabin sections in their extended positions of use and reinforcing said cabin sections against relative vertical angular displacement when said sections are extended.

14. An expandable camper adapted to be carried on a vehicle, comprising:

a telescoping cabin including front and rear telescoping cabin sections, co-acting means on said cabin sections supporting said sections for relative longitudinal movement between telescoped positions of travel and extended positions of use, one end of one of said cabin sections telescopically receiving the adjacent end of the other cabin section, whereby said one section constitutes an outer cabin section and said other section constitutes an inner cabin section, the opposite end of said inner cabin section being externally enlarged to approximately the same external dimensions as said outer cabin section, said opposite end of said inner cabin section having a shoulder facing said outer cabin section and extending upwardly across the sidewalls and horizontally across the top of said inner section to seat said end of said outer cabin section when said cabin sections occupy said telescoped positions, and co-acting latch means on said cabin sections for releasably latching said sections in at least one of said positions comprising a bracket fixed to and extending beyond said end of said outer cabin section, a first latch member mounted on the free end of said bracket, said shoulder having an opening to receive said bracket when said cabin sections occupy said telescoped positions, and a second latch member mounted on said opposite end of said inner cabin section for releasable latching engagement with said first latch member when said cabin sections occupy said telescoped positions.

15. An expandable camper adapted to be carried on a vehicle having a rear open cargo space, comprising:

a telescoping cabin including a front section having an open rear end and a rear section having an open front end telescopically receiving the rear end of said front section, said front and rear sections including spaced, overlapping side walls, a pair of longitudinal tracks mounted on the outer surfaces of said front section side walls, rollers mounted on said rear section side walls forwardly of the front end of said rear cabin section and disposed in caged rolling engagement with said tracks, respectively, a pair of upper longitudinal gear racks mounted on the inner surfaces of said rear section side walls adjacent the upper edges of the latter walls, a pair of lower longitudinal gear racks mounted on the inner sides of said rear section side walls adjacent the lower edges of the latter walls, an upper shaft rotatably mounted on the rear end and extending crosswise of said front cabin section adjacent the top thereof, a lower shaft rotatably mounted on the rear end and extending crosswise of said front cabin section adjacent the bottom thereof, upper pinion gears fixed on the outboard ends of said upper shaft and disposed in meshing engagement with said upper racks, respectively, lower pinion gears fixed on the outboard ends of said lower shaft and disposed in meshing engagement with said lower racks, respectively, sprockets fixed on the outboard ends of said shafts between the confronting front and rear section side walls, and sprocket chains disposed in the spaces between said confronting side walls and trained about the adjacent shaft sprockets for drivably connecting said upper and lower shafts to effect rotation thereof in unison, thereby to restrain said cabin sections against relative angular movement during relative longitudinal movement of said cabin sections between telescoped positions of travel and extended positions of use.

16. A camper according to claim 15 wherein:
said front cabin section includes a rear hollow tubular frame member extending across the rear end thereof adjacent the top of the latter section and said upper shaft extends through and is rotatably supported in said frame member.

17. An expandable camper adapted to be carried on a vehicle having a rear open cargo space, comprising:
a cabin including front and rear telescoping sections,
said front cabin section being adapted to be positioned within said cargo space,
front and rear hydraulic jacks mounted on said front cabin section at opposite sides thereof for supporting said front section in an elevated position above the ground,
co-operating cantilever means on said front and rear cabin sections supporting said rear cabin section on said front cabin section for movement of said rear section relative to said front section between telescoped position of travel and an extended position of use while said front section is supported in said elevated position, and
additional jacks on the rear end of said rear cabin section for supporting said rear cabin section in an elevated position above the ground.

18. A camper according to claim 17 wherein:
said rear cabin section includes upright hollow tubular frame members at the rear ends thereof,
said additional jacks comprise posts extending through said frame members, and
means for locking said jack posts against axial movement relative to said frame members.

19. In combination:
a vehicle having a chassis defining a rear open cargo space bounded by upstanding chassis side walls, and
an expandable camper mounted on said vehicle comprising a telescoping cabin including a front cabin section having an open rear end and a rear cabin section having an open front end telescopically receiving the rear end of said front section, coacting means on said cabin sections supporting said rear section on said front section for longitudinal movement relative to said front section between a forward telescoped position of travel and a rear extended position of use, said front cabin section including upright side walls with inwardly stepped lower portions and a floor extending between and joined to said inwardly stepped side wall portions adjacent the lower edges thereof to define on said front section a relatively narrow base dimensioned to fit closely within said cargo space, said rear cabin section including upright side walls located outboard of said front section side walls and having their lower edges disposed adjacent the plane of said front section floor, said inwardly stepped portions of said front section side walls and the lower portions of said rear section side walls defining therebetween relatively wide forwardly and downwardly opening chassis clearance gaps, and floor means operatively associated with said rear cabin section for providing a floor which extends across the entire width of said rear cabin section and between said lower edges of said rear section side walls when said rear cabin section is extended to said position of use, and
said cabin being mounted on said vehicle with said front section base position in said cargo space, said rear section side walls disposed laterally outboard of said vehicle chassis, and said chassis side walls positioned within said clearance gaps, thus to permit telescoping movement of said rear cabin section relative to said front cabin section between said telescoped and extended positions while said cabin is mounted on said vehicle.

References Cited

UNITED STATES PATENTS

| | | | |
|---|---|---|---|
| 2,457,581 | 12/1948 | McCain | 296—23.3 |
| 2,569,641 | 10/1951 | Metherell | 296—23.3 |
| 2,747,465 | 5/1956 | Manuel | 296—26 X |
| 2,893,780 | 7/1959 | Ervine | 296—23.3 |
| 3,116,085 | 12/1963 | Uttley | 296—26 |
| 3,186,754 | 6/1965 | Winstead | 296—23 |
| 2,813,747 | 11/1957 | Rice | 296—23 |
| 3,137,041 | 6/1964 | Mullen | 296—23 X |

FOREIGN PATENTS

| | | |
|---|---|---|
| 1,053,230 | 9/1953 | France. |
| 302,915 | 11/1932 | Italy. |

BENJAMIN HERSH, *Primary Examiner.*

P. GOODMAN, *Assistant Examiner.*